United States Patent [19]

Kersten et al.

[11] Patent Number: 4,765,819

[45] Date of Patent: Aug. 23, 1988

[54] METHOD FOR MAKING PLANAR LIGHTWAVE GUIDES

[75] Inventors: Ralf T. Kersten, Bremthal; Wolfgang Siefert, Mainz, both of Fed. Rep. of Germany

[73] Assignee: Schott Glaswerke, Mainz, Fed. Rep. of Germany

[21] Appl. No.: 919,401

[22] Filed: Oct. 16, 1986

[30] Foreign Application Priority Data

Oct. 16, 1985 [DE] Fed. Rep. of Germany ....... 3536780

[51] Int. Cl.$^4$ .......................... C03B 8/04; C03C 21/00
[52] U.S. Cl. ........................ 65/30.1; 65/18.2; 65/31; 65/60.2; 350/96.12; 372/45
[58] Field of Search ...................... 65/30.1, 30.13, 31, 65/3.12, 3.14, 60.2, 60.51, 18.2; 427/163, 166, 162; 430/321; 350/96.12, 320; 372/45, 46; 29/569 L

[56] References Cited

U.S. PATENT DOCUMENTS

| | | | |
|---|---|---|---|
| 3,647,406 | 3/1972 | Fisher | 65/30.13 |
| 3,817,730 | 6/1974 | Uchida | 65/30.13 |
| 3,843,228 | 10/1974 | Yoshiyagawa | 65/30.13 X |
| 4,652,290 | 3/1987 | Cho | 65/60.2 X |

OTHER PUBLICATIONS

Hass et al; Physics of Thin Films, vol. 5, 1969; Academic Press, N.Y., p. 238.

Primary Examiner—Kenneth M. Schor
Attorney, Agent, or Firm—Millen & White

[57] ABSTRACT

A planar lightwave guide with light-conducting core zones in light conducting strips is made by the precipitation out of a gaseous phase onto a substrate a thin, glass-like strata in accordance with a programmed schedule so as to allow a predetermined refractive index curve to be obtained to thereby form a light-conducting core zone and protective sheathing layers adjacent to the core zone. The improvement in the method is characterized in that the precipitation out of the gaseous phase is obtained by application of a heterogeneous reaction and in that after the formation of the light-conducting strips, the refractive index of the core-forming strata is modified in a targeted manner in a lateral marginal region of the strips by diffusing out the doping substance which determines the refractive index curve in the core zones. Subsequently these strips and the substrate are coated with a covering layer of a material having a lower refractive index than that of the core zone material.

7 Claims, 1 Drawing Sheet

METHOD FOR MAKING PLANAR LIGHTWAVE GUIDES

BACKGROUND OF THE INVENTION

The invention relates to a method of making a planar lightwave guide with light conducting strips by the precipitation out of materials in the gaseous phase on a substrate of thin, glass-like strata in accordance with a programmed schedule thereby allowing a predetermined refractive index curve to be obtained so that a light-conducting core zone and protective sheathing layers adjacent to said core zone are formed, the said light-conducting strips being subsequently produced from this strata system.

Planar lightwave guides are used in optical communication systems as coupling elements for optical wave conductors. Depending on the chosen arrangement, these coupling elements serve the purpose of signal branching and signal mixing, i.e. they serve as demultiplexes/multiplexer elements.

A known method for making these wave guides is the CVD process in which $SiCl_4$ of high purity is mixed with a few per cent of $TiCl_4$ and caused to react with oxygen in an open flame. The glass particles which are produced by flame hydrolysis are deposited on a substrate. During the deposition process, the burner is continuously reciprocated so that several layers are formed. The refractive index is controlled by the $TiCl_4$ current. Thereafter the substrate with the porous glass layers is heated in order that the individual layers will consolidate (Kawachi et al., Electronics Letters 1983, Vol. 19, No. 15, page 583).

The layer system is then covered with a silicon mask and guide grooves for the accommodation of wave conductors as well as light conducting strips are produced by targeted etching (Yamada et al., Electronics Letters 1984, Vol. 20, No. 8, Page 313).

These known planar wave guides have the disadvantage that the refractive index profile through the deposited layer can be predetermined in only one direction, namely in the direction normal to the substrate. After etching, the light-conducting strip has substantially rectangular cross-sectional configuration and the profile of the light-conducting core is not laterally adapted which gives rise to considerable losses due to dampening. Another drawback resides in that only relatively thick layers can be produced so that finely graded refractive index profile cannot be obtained.

A method is known from European Patent Application No. EP-0052901 whereby coupling elements are made with light-conducting strips which are round in cross-section. To this end, grooves having a semicircular cross sectional configuration are formed mechanically or by etching the substrate glass plate in accordance with a predetermined pattern. In the next step, glass-like layers are precipitated out of the gaseous phase onto the glass plate and in these grooves by application of a CVD process. With increasing layer thickness, increasingly more doping material is deposited jointly with the quartz glass. This is continued until the grooves are completely filled by these layers. The same is applied to another substrate provided with the corresponding mirror-image groove pattern. Then both substrates plates are polished and joined so that the grooves with the glass-like layers coincide. Whilst these strip conductors have a circular cross section with a radially outwardly decreasing refractive index, their manufacture is not without problems.

The production process and particularly the polishing operation are very expensive. The grooves must coincide precisely and neither impurities nor air gaps may remain at the seam or junction between the substrate plates in the region of the light-conducting layers.

SUMMARY OF THE INVENTION

It is an object of the present invention to provide a method for making planar waveguides in which the afore-described disadvantages appertaining to the state-of-the-art are avoided. The method according to the invention is substantially simpler while at the same time the resulting planar wave guide is distinguished from the known planar wave guides by lower losses.

The aforementioned object is realized in accordance with an embodiment of the invention by a method in which the precipitation out of a gaseous phase is obtained by a heterogeneous reaction. After the formation of light-conducting strips, which may be done mechanically or according to conventional etching processes, the refractive index of the core-forming strata is modified in a targeted fashion in the lateral marginal region of the strips by diffusing out the doping material which determines the refractive index curve in the core. Subsequently the strips and the substrate are covered with a covering layer of a material having a lower refractive index that the core material.

The afore described diffusing process can be controlled so as to obtain in lateral marginal regions of the light-conducting cores, a refractive index curve, which corresponds substantially to the curve of refractive index in a vertical direction relative to the strata.

Preferably the precipitation of the glass-like strata is obtained in a non-isothermic plasma-CVD process. The process for precipitation out of material in the gaseous phase is already known, for example from EP-0017296 and is herein understood to be a process which operates with a so-called "cold" plasma in which only electrons have a high kinetic energy. With such a plasma, even gas mixtures which are not thermally reactive can be caused to react. With this non-isothermic, PCVD process, it is possible at fairly low temperatures, to precipitate glass-like or glassy layers directly out of a gaseous phase so that subsequent heat application for vitrification may be dispensed with. A further advantage resides in that for a precipitation at low temperature, that is to say between room temperature and 300° C., any potentially existing difference in the thermal expansion coefficients of the glass plate material and the layers deposited thereon will not have a noticeable adverse effect.

Upon further study of the specification and appended claims, further objects and advantages of this invention will become apparent to those skilled in the art.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein.

DESCRIPTION OF THE PREFERRED EMBODIMENTS

With respect to practicing the instant invention a process is utilized which is already known, for example from EP-0017296, and is herein understood to be a process which operates with a so-called "cold" plasma in which only electrons have a high kinetic energy. With such a plasma even gas mixtures which are not thermally reactive can be brought to reaction. With this non-isothermic, PCVD process it is possible at fairly low temperatures to precipitate glass-like layers directly out of a material in a gaseous phase so that subsequent heat application for vitrification may be dispensed with. A further advantage of using the known process resides in that for a precipitation at low temperatures, that is to say temperatures between room temperature and 300° C., any potentially existing difference in the thermal expansion coefficients of the glass plate material and the layers deposited thereon will not have a noticeable adverse effect.

Figure 1:
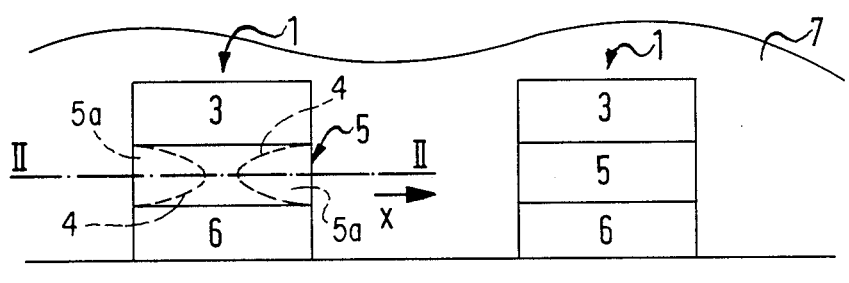
FIG. 1 is a section through a planar wave-guide made in accordance the method of the present invention.
Figure 2:
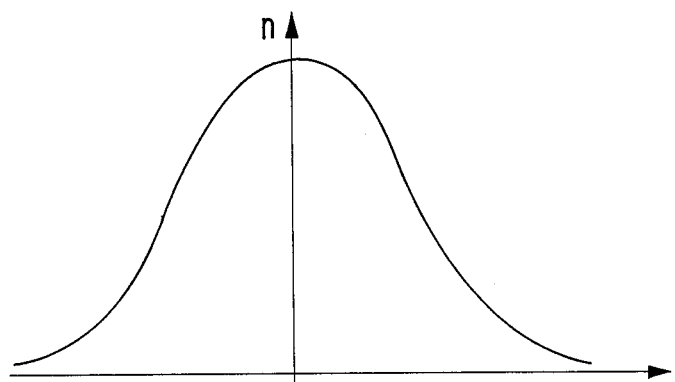
FIG. 2 shows the refractive index curve along line II—II of FIG. 1.

Considering now the specific embodiment illustrated by FIGS. 1 and 2, it is seen that FIG. 1 shows in lateral section a planar wave-guide with a substrate 2 and a two light-conducting strips 1. Each strip 1 consists of a core zone 5 and sheathing layers 3 and 6 above and beneath the core zone, the core and each layer being fabricated by creating glass strata by precipitating glassy material out of a cold plasma or gaseous phase by utilizing a heterogeneous reaction. After the production of the strips 1 by mechanically removing or chemically etching the lamination consisting of the core zone sandwiched between the sheathing layers 3 and 6 so as to delineate opposed marginal surfaces 8 extending transverse with respect to the layers 3 and 6, the doping material which is contained in the core zone 5 is diffused out by heat application so that regions 5a are formed in each light conducting strip 1. The regions 5a are approximately defined by the dotted lines 4. In these regions the refractive index is reduced by comparison with the original refractive index in core zone 5. During the formation of the sheathing layer 6 due care is taken to select the thickness such as to ensure a complete isolation of wave energy relative to substrate 2.

The refractive index curve along line II—II (X-direction) in FIG. 1 is illustrated in FIG. 2. After the diffusing out process, the substrate 2 and strips 1 are coated with a material 7 of low light refraction such as $SiO_2$.

For making a monomode-fiber, a core zone 5 of about 2-8 um is produced. In the case of a Germanium-doped core the doping material will be diffused out for about 2-5 minutes at a temperature of 2000°-2200° C.

Germanium is an example of a doping material which can be eliminated from the core zone 5 by diffusion. However, other substances which can be diffused out may be used. Depending on whether the light-conducting strips are to serve as multi-mode wave guides, as mono-mode wave guides or as polarizing wave guides, the dimensions of the core 5 and the numerical aperture as well as the refractive index curve are appropriately adjusted by the differences between the refractive indices (numerical aperture), and by the geometry and dimensions of the core zone 5 which are about 5-10 $\mu$ for mono-mode wave guides.

In order to ensure that the wave energy will be completely isolated relative to the substrate, the thickness of the sheathing layer 6 between the substrate 2 and the core zone is selected to be of corresponding value, in other words in the range of 5-50 $\mu$. This has the advantage that the substrate 2 does not participate in lightwave conduction and for this reason need not consist of a high- purity material, which in turn decreases expense.

For optical fibre-coupling purposes, guide grooves (not shown) are defined by the light-conducting strips 1 in the substrate 2 into which grooves the wave conductors which are to be mated therewith are inserted.

With the planar wave guides produced in accordance with this invention absorption losses are significantly lower than 0.2 dB/cm.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of making a planar lightwave-guide with light-conducting core zones, the method comprising the steps of:
    depositing an initial sheathing layer of glassy material on a substrate by precipitating the glass material directly out of a cold plasma onto the substrate in thin glassy strata using a heterogeneous reaction;
    depositing a light-conducting core zone over the first sheathing layer by precipitating glassy material out of a cold plasma containing a doping material onto the first sheathing layer in thin glassy strata using a heterogenous reaction to form doped, core strata for conducting light wave energy;
    depositing a subsequent sheathing layer of glassy material over the core zone by precipitating the glassy material out of a cold plasma onto the core zone in thin glassy strata using a heterogeneous reaction; thereby fabricating a lamination of a light conducting core zone sandwiched between a pair of sheathing layers;
    delineating opposed marginal surfaces in the core zone and sheathing layers, the opposed marginal surface extending transverse with respect to the layers to define light conducting strips each having a core zone sandwiched between a pair of sheathing layers;
    diffusing doping material out of the core zones of the strips in portions of the core zones adjacent to the delineated marginal surfaces to modify the refractive index curve of the core zones, and
    covering the strips and substrate with a layer of material having a lower refractive index than that of the core zone.

2. The method according to claim 1, wherein the precipitation of the glassy strata is carried out by means of a non-isothermic plasma CVD process.

3. The method according to claim 1 wherein the light-conducting core zone is formed of $SiO_2$ doped with Germanium.

4. The method according to claim 1 wherein the refractive index profile, the numerical aperture and the dimensions of the core zone are selected so as to form a mono-mode wave guide with predetermined properties.

5. The method according to claim 1 wherein the refractive index profile, the numerical aperture and the dimensions of the core zone are selected so as to form a multi-mode, wave-guide with predetermined properties.

6. The method according to claim 1 wherein the refractive index profile, the numerical aperture and the dimensions of the core zone are selected to form a polarizing lightwave guide.

7. The method according to claim 1 wherein the thickness of the initial sheathing layer between the substrate and the core zone is selected to completely isolate the substrate from light wave energy in the core zone.

* * * * *